United States Patent [19]

Yu

[11] 4,154,222
[45] May 15, 1979

[54] SOLAR COLLECTOR FOR GAS HEATING

[75] Inventor: Ying-Nien Yu, Marina del Rey, Calif.

[73] Assignee: Ying Mfg., Corp., Gardena, Calif.

[21] Appl. No.: 833,589

[22] Filed: Sep. 15, 1977

[51] Int. Cl.² ............................................. F24J 3/02
[52] U.S. Cl. .................................. 126/270; 126/400;
    237/1 A; 165/104 S; 165/170
[58] Field of Search ....................... 126/270, 271, 400;
    237/1 A; 165/104 S, 18, 170, DIG. 4

[56] References Cited

U.S. PATENT DOCUMENTS

| 2,677,367 | 5/1954 | Telkes | 126/270 |
|---|---|---|---|
| 3,029,806 | 4/1962 | Okuda | 126/271 |
| 4,016,861 | 4/1977 | Taylor | 126/270 |
| 4,019,494 | 4/1977 | Safdari | 126/270 |
| 4,029,258 | 6/1977 | Groth | 237/1 A |
| 4,033,324 | 7/1977 | Eckels | 126/270 |
| 4,040,566 | 8/1977 | Chiarelli | 237/1 A |
| 4,061,129 | 12/1977 | Wilson | 126/400 |

FOREIGN PATENT DOCUMENTS 1097233  7/1955  France ............................. 126/271

*Primary Examiner*—James C. Yeung
*Attorney, Agent, or Firm*—William W. Haefliger

[57] ABSTRACT

Heat transfer structure comprises:
a. sandwich assembly including a heat transfer plate to receive infra-red radiation or to transmit such radiation, respectively to or from skyward,
b. the assembly defining an enclosed gas flow chamber at the underside of said plate, there being spaced air inlet and outlet ports respectively to and from the chamber, and
c. baffling in said chamber to direct gas passing through the chamber via said ports to freely flow tortuously and with turbulence adjacent major extent of the underside of said plate.

16 Claims, 9 Drawing Figures

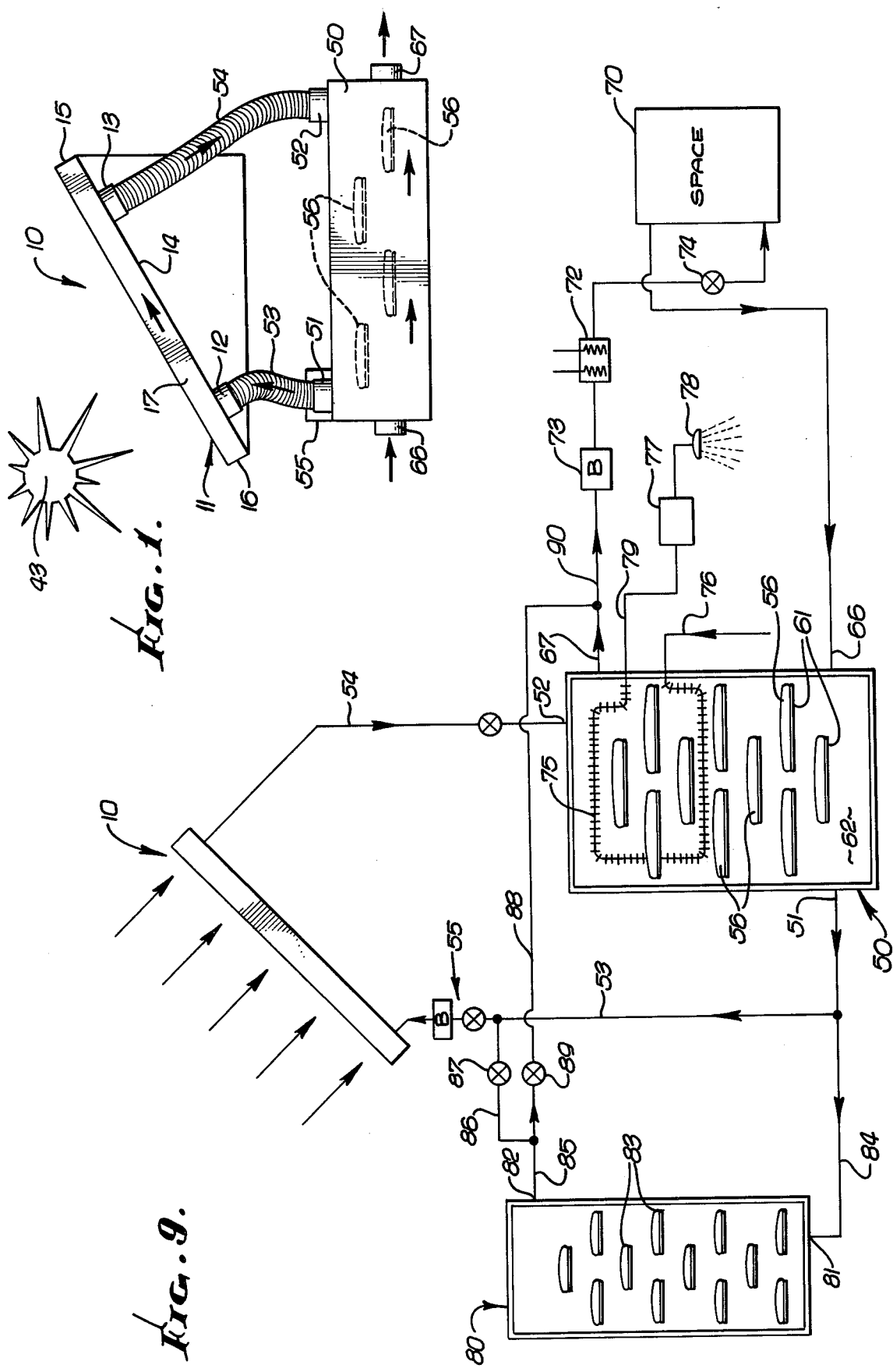

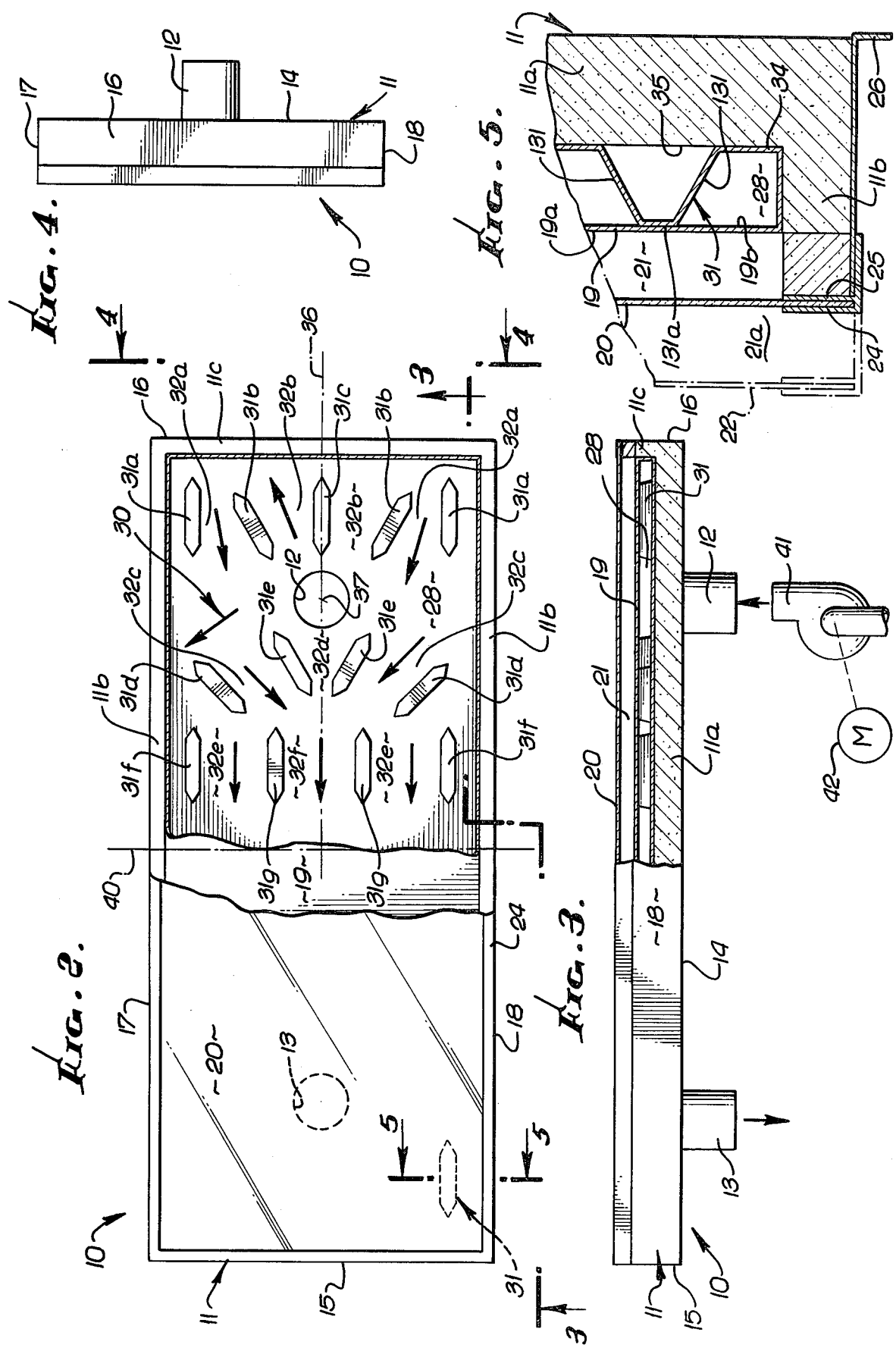

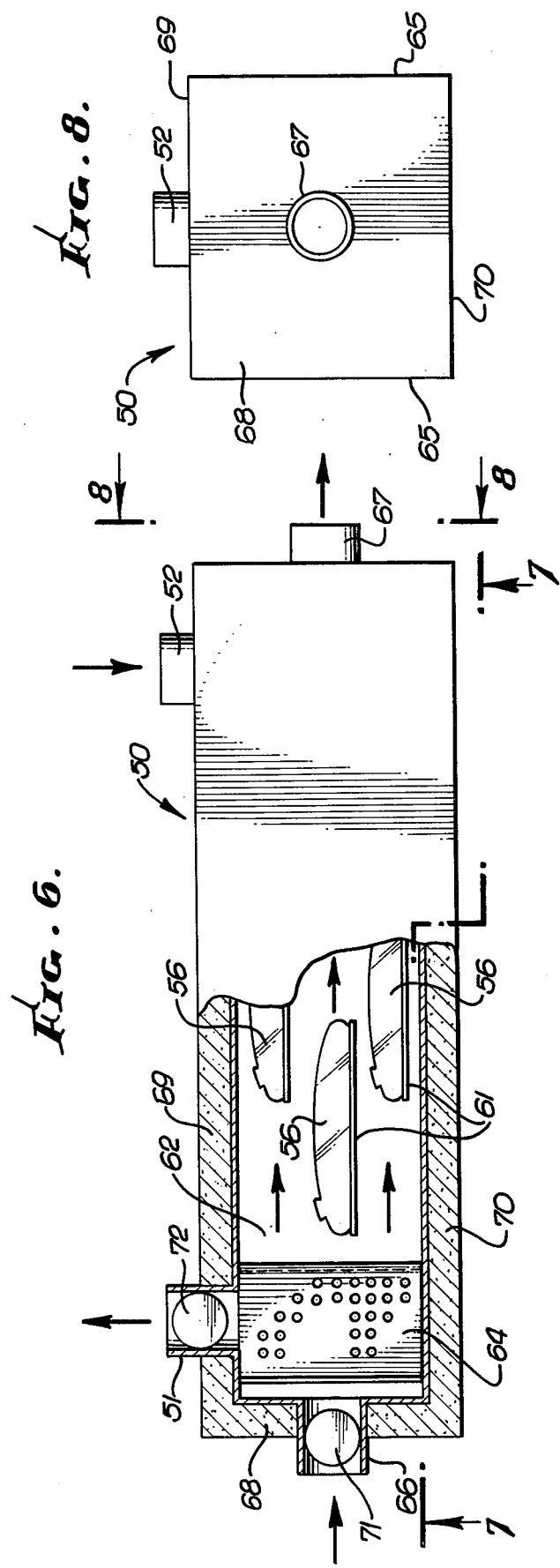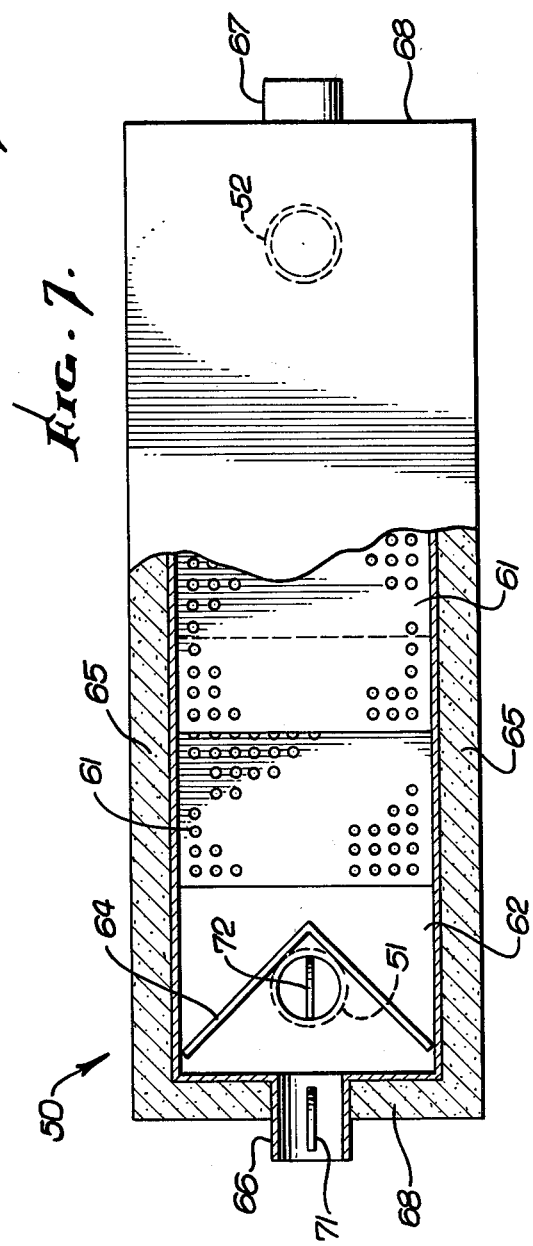

SOLAR COLLECTOR FOR GAS HEATING

BACKGROUND OF THE INVENTION

This invention relates generally to heat transfer to and from gases via solar collector structure; and more particularly it concerns components in such collectors as well as in heat storage media associated with such collectors.

There is increasing need and demand for efficient solar heat collection and storage devices for energy conservation. Particularly needed are efficient means to transfer heat between dark plates and flowing gas in such collectors, and to store heat obtained from such collectors, for later use. No prior devices to my knowledge have incorporated the unusually advantages in construction, mode of operation and results as are now afforded by the present invention.

SUMMARY OF THE INVENTION

One major object of the invention is to provide an efficient heat transfer structure, which in accordance with the invention comprises:
  a. a sandwich assembly including a heat transfer plate to receive infra-red radiation or to transmit such radiation, respectively to or from skyward,
  b. the assembly defining an enclosed gas flow chamber at the under side of said plate, there being spaced air inlet and outlet ports respectively to and from the chamber, and
  c. baffling in said chamber to direct gas passing through the chamber via said ports to freely flow tortuously and with turbulence adjacent major extent of the underside of said plate.

As will be seen, the assembly typically includes a lower plate spaced from the heat transfer plate to form the lower side of the chamber, the baffles projecting from that plate toward the heat transfer plate to support the latter. Such baffles may be so formed and spaced apart as to ensure flow of entering gas in turbulent and scavenging relation with substantially the entire side of the heat transfer plate facing the flow chamber, for efficient heat transfer.

Another object of the invention is to provide a simple and inexpensive as well as efficient solar collector structure.

A further object of the invention is to provide improvements in storage of heat derived from the collector, through use of liquid containing flexible containers, as for example water filled plastic bags, easily transportable to be located and supported in an auxiliary chamber with which the collector has gas flow communication. Finally, an entire heat collection, storage and distribution system is provided, in accordance with a further aspect of the invention.

These and other objects and advantages of the invention, as well as the details of illustrative embodiments, will be more fully understood from the following description and drawings, in which:

DRAWING DESCRIPTION

FIG. 1 is an elevation showing an application of the invention;

FIG. 2 is a plan view, partly broken away, to show the interior of the FIG. 1 solar collector;

FIG. 3 is a side view on lines 3—3 of FIG. 2;

FIG. 4 is an end view taken on lines 4—4 of FIG. 2;

FIG. 5 is an enlarged fragmentary section taken on lines 5—5 of FIG. 2;

FIG. 6 is a side elevation, partly broken away, of the auxiliary chamber shown in FIG. 1;

FIG. 7 is a bottom plan view, partly broken away, of the FIG. 6 chamber, and taken on lines 7—7 of FIG. 6;

FIG. 8 is an end view on lines 8—8 of FIG. 7;

FIG. 9 is a schematic view of a system incorporating the invention.

DETAILED DESCRIPTION

FIGS. 1-5 illustrate heat transfer structure, as for example solar collector 10, adapted to heat or cool gas passed through the structure. The latter may for example include an enclosure 11 having gas inlet and outlet ports 12 and 13 at the rear side 14 of the enclosure. The latter may for example be rectangular, as shown, and lengthwise elongated, so that the ports 12 and 13 are longitudinally spaced apart, and also spaced from the enclosure end walls 15 and 16, and side walls 17 and 18, which may consist of lightweight metal sheets.

The heat transfer structure may advantageously take the form of the sandwich assembly as illustrated in FIG. 5, including a heat transfer plate 19, preferably metallic and blackened at its upper facing surface 19a, to receive infra-red radiation or to transmit such radiation, respectively to or from skyward. A translucent or transparent protective plastic sheet 20 may overlie plate 19 to form a dead air space 21 therebetween, for providing a "green-house" effect, enhancing heat transfer efficiency. Plate 20 may for example consist of LEXAN plastic. A second transparent plastic sheet may be employed, as optionally indicated by broken lines 22, to provide a second dead air space 21a. All the elements 19, 20 and 22 are carried by the enclosure, which may consist of heat insulative foamed plastic such as polyurethane, and including a backer layer 11a to the rear of the plates and parallel thereto, as well as defining the side and end walls 11b and 11c. Parallel flanges 24 and 25 integral with the metallic side wall panel or sheet retain the periphery of the transparent plastic sheet 20 therebetween, as indicated in FIG. 5. A mounting flange 26 may be integral with the side and end walls.

The assembly defines an enclosed gas flow chamber or passage, as for example at 28, at the underside of the plate 19, and via which gas flows within the enclosure and between the ports 12 and 13. The chamber 28 may be rectangular as shown, and contain baffling to direct the freely flowing gas tortuously and with turbulence adjacent the major extent of the exposed underside 19b of the plate 19. Accordingly, optimum heat transfer occurs between the plate and the gas, whereby if the plate is heated by solar radiation, the gas such as air correspondingly is optimally heated. Similarly, optimal heat transfer from the gas to the plate, for skyward radiation, occurs at night.

One especially advantageous flow path or paths is indicated by the flow arrows 30 in FIG. 2, the flow reaching all corners of the chamber 28 in flowing between the ports. The baffling to produce such flow includes multiple, elongated baffles 31 which are openly spaced apart about the ports to form multiple flow channels 32 extending toward opposite ends of the chamber and toward the mid-region of the chamber between the ports. Note that the baffle lengths, for this purpose, are about the same as the flow channel widths, as measured between successive baffles.

Note also that the baffles may be formed by a lower metal plate 34 spaced below the heat transfer plate, and adjacent the inner wall 35 formed by the insulative bottom wall 11a. Thus, the bottom plate 34 may be deformed as by deep drawing and toward the upper plate to form the baffles 31, which are consequently hollow and very light weight. Note their tapered sides at 131, and flat upper ends 131a, which support plate 19 at multiple locations over chamber 28.

FIG. 2 defines a first transverse row of baffles 31a, 31b and 31c. Baffles 31a are symmetric with respect to a lengthwise plane 36 through the axis 37 of port 12 and perpendicular to wall 19; and baffles 31b are likewise symmetric with respect to that plane. Note channels 32a and 32b between such baffles. Angled and symmetric pairs of baffles 31d and 31e extend in a transverse row and between the ports, and form flow channels 32c and 32d; and parallel and symmetric pairs of baffles 31f and 31g extend in a transverse row and between the ports and form flow channels 32e and 32f. Similarly, three like rows of baffles may be located near or associated with port 13, with symmetric correspondence to the described three rows of baffles, with respect to a transverse center axis 40. The baffles are of like length and width, and have tapered ends as shown. Optimum heat transfer is thereby obtained.

A blower may be employed, as at 41 in FIG. 3, and driven by an electric motor 42, to displace gas such as air through the chamber 28, for heating or cooling such air. FIG. 1 shows the structure 10 angled toward the path of the sun 43 crossing the sky, for heating air during the day, and for cooling such air at night. An auxiliary chamber or tank 50 has inlet and outlet ports 51 and 52 in communciation via ducts 53 and 54 with ports 12 and 13, a blower and damper structure being indicated at 55. Heat source or sink bodies (schematically indicated at 56) are located in the auxiliary chamber 50 to be heated by hot gas entering the chamber 50 from the collector 10 during the day. At night, damper 55 is closed and its associated blower is shut down; a separate stream of air or gas is passed through the chamber via auxiliary ports 66 and 67 and in heat transfer communication with the heat storing bodies to be heated thereby. Such bodies may with unusual advantage comprise liquid containing flexible containers, as for example water containing plastic bags. Such bags are easy and inexpensive to ship, fill with water and amount in many different types and sizes of chambers 50, as for example rooms, cabinets, etc., enhancing versatility. Air passing through the chamber 50 via ports 66 and 67 may be used to heat or warm living areas, etc. Conversely, in the summer when cool air is desired for such areas during the day, the bodies 56 are cooled at night as by flowing cool air from the collector into chamber 50. Heat is extracted from such return air by black body radiation, skyward, from plate 19.

FIGS. 6-8 show in greater detail a representative interior of chamber 50, with bags 56 supported on perforated ledges or panels 61 within the chamber interior 62. Note perforated header 64 at the entrance end of the chamber interior, to distribute the entering air in uniformly distributed paths or streams to flow laterally over the bags 56. Chamber 60 is shown insulated side and end walls 65 and 68, and top and bottom walls 69 and 70. Dampers are shown at 71 and 72, for control.

A more complete system is shown in FIG. 9, with elements corresponding to those previously described given corresponding identifying numerals. Air passing from chamber 50 via port 67 passes to a space 70 to be warmed, via blower 73, auxiliary heater 72 (to be used when air from chamber 50 is no longer warm enough), blower 73 and damper 74. Finned tubing 75 may extend within the interior 62 of chamber 50 in the path of gas flow for transferring heat between such gas flow and liquid in the tubing. For example, water may enter the tubing at 76, leave it at 79, and flow to a tank 77 supplying a shower 78 or other utility where warm water is required. If required, the finned tubing 75 may be in direct heat transfer communication with line 54, outside chamber 50.

A separate chamber 80, like chamber 50, has gas inlet and outlet porting 81 and 82, and also contains spaced apart heat source or sink bodies 83 (corresponding to bodies 56). Additionally ducts 84-86 connect the chamber ports with the interior of chamber 50, and with the solar collector, as shown. Note damper 87 in duct 86. Thus, chamber 80 is selectively connectible in series with chamber 50 for added capacity. Duct 88 connects outlet port 82 with duct 90, the latter extending between port 67 and space 70, and a damper 89 in duct 88 controls the selective inclusion of chamber 80 in the path of air circulating to and from space 70.

In FIG. 5, baffles 31 may be formed by the insulative bottom wall, so that bottom plate 34 may be eliminated.

I claim:

1. In heat transfer structure, the combination comprising
    a. a sandwich assembly including a heat transfer plate to receive infra-red radiation or to transmit such radiation, respectively to or from skyward,
    b. the assembly defining an enclosed gas flow chamber at the underside of said plate, there being spaced air inlet and outlet ports respectively to and from the chamber, the chamber having lengthwise spaced opposite ends from which said ports are spaced in a lengthwise direction, and
    c. baffling in said chamber to direct gas passing through the chamber via said ports to freely flow tortuously and with turbulence adjacent major extent of the underside of said plate, said baffling including first multiple elongated baffles associated with the inlet port and divergent generally in said lengthwise direction toward one end of the chamber closest the inlet port thereby to initially direct gas flow entering the chamber via said inlet toward said one end of the chamber, for subsequent endwise flow back toward the opposite end of the chamber, and second multiple elongated baffles associated with the outlet port and divergent generally in said lengthwise direction toward the opposite end of the chamber closest the outlet port thereby to subsequently direct gas flow traveling lengthwise of the chamber and then proximate said opposite end of the chamber generally back toward the outlet to exit the chamber via said outlet.

2. The combination of claim 1 wherein said assembly includes a lower plate spaced below said heat transfer plate, and insulation at the lower side of said lower plate and extending peripherally of said chamber.

3. The combination of claim 1 including ducting connected with said ports, and a blower connected in series with said ducting to effect gas flow through said chamber.

4. The combination of claim 2 wherein the chamber in generally rectangular, said ports extending through the lower plate, the outlet port located at a higher elevation than the inlet port when the chamber is tilted upward from one end thereof.

5. The combination of claim 2 wherein the chamber is generally rectangular, the ports extending through the lower plate, the baffling including other elongated baffles which are openly spaced apart to form multiple flow channels extending toward the mid-region of the chamber between the ports, baffle lengths being about the same as the flow channel widths as measured between baffles.

6. The combination of claim 2 wherein the lower plate is locally deformed toward the upper plate to define certain of said baffles.

7. The combination of claim 1 including an auxiliary chamber in communication with said gas flow chamber via said ports, said auxiliary chamber containing spaced apart heat source or sink bodies, said auxiliary chamber having auxiliary ports to circulate a separate gas stream into and out of the auxiliary chamber and in heat transfer communication with said bodies.

8. The combination of claim 7 wherein said bodies comprise liquid containing flexible containers.

9. The combination of claim 8 wherein said containers comprise plastic bags.

10. The combination of claim 9 including blower and damper structure in communication with ducts interconnecting said gas flow chamber and said auxiliary chamber for controlling gas flow therebetween, thereby to transfer heat between the gas flow and said bodies.

11. In combination with a solar heat collector having heat transfer structure as defined in claim 1,
 a. an auxiliary chamber having porting to circulate said gas between the collector chamber of claim 1 and the auxiliary chamber,
 b. said auxiliary chamber containing spaced apart heat storage bodies in the form of liquid containing flexible containers.

12. The combination of claim 11 wherein said containers comprise plastic bags.

13. The combination of claim 11 wherein said auxiliary chamber has auxiliary ports to circulate a separate gas stream into and out of the auxiliary chamber and in heat transfer communication with said bodies.

14. The combination of claim 13 including said solar heat collector, and blower and damper structure in communication with ducts interconnecting said solar chamber with said auxiliary chamber for controlling gas flow therebetween, thereby to transfer heat between the gas flow and the bodies.

15. The combination of claim 14 including finned tubing extending in said auxiliary chamber in the path of gas flow therein, for transferring heat between said gas flow and liquid circulating in said tubing.

16. The combination of claim 14 including a separate chamber having gas inlet and outlet porting and also containing spaced apart heat storage bodies in the form of liquid containing flexible bags, there being additional ducting connecting said separate chamber with the interior of said auxiliary chamber and with said solar chamber.

* * * * *